United States Patent [19]

Friswell et al.

[11] Patent Number: 5,049,189
[45] Date of Patent: Sep. 17, 1991

[54] METHOD OF PREPARING A SOLUTION OF SULFONATED ARYL AZO/DIARYL GUANIDINE-COMPLEXED DYE

[75] Inventors: Michael R. Friswell, Wayne; Michael P. Hinton, Neshanic Station; Alejandro Zimin, Wayne, all of N.J.

[73] Assignee: Morton International, Inc., Chicago, Ill.

[21] Appl. No.: 474,427

[22] Filed: Feb. 2, 1990

[51] Int. Cl.$^5$ .............................................. C09D 11/02
[52] U.S. Cl. ......................................... 106/22; 8/501; 8/661; 8/680; 8/681; 8/682; 8/689; 8/690
[58] Field of Search ...................... 106/22; 8/501, 661, 8/680, 681, 682, 689, 690

[56] References Cited

U.S. PATENT DOCUMENTS 3,915,630 10/1975 Renault et al. ........................ 8/661
3,915,952 10/1975 Sailer et al. ............................ 8/687
4,370,144 1/1983 Skelly et al. ........................... 8/501

FOREIGN PATENT DOCUMENTS 1418204 12/1975 United Kingdom .................... 8/501

Primary Examiner—Karl Group
Assistant Examiner—Helene Klemanski
Attorney, Agent, or Firm—Wayne E. Nacker; Gerald K. White

[57] ABSTRACT

A liquid dyestuff, useful as a major component of a ballpoint ink is prepared. A dye base, having both a sulfonic acid group and an azo group bonded to the same aromatic ring system, is provided in the aqueous phase of a two-phase system in which the organic phase is about 30 percent or more benzyl alcohol. In this two-phase system, the dye base is complexed with a diaryl quanidine, and the resulting dye concentrates in the organic solvent phase.

9 Claims, No Drawings

METHOD OF PREPARING A SOLUTION OF SULFONATED ARYL AZO/DIARYL GUANIDINE-COMPLEXED DYE

The present invention is directed to a method of preparing a non-aqueous liquid dye formulated for ink applications in which a sulfonated aryl azo moiety is complexed to an aryl guanidine moiety, and particularly, to a method of preparing such a dyestuff without the complexed dye being initially produced in powdered form.

BACKGROUND OF THE INVENTION

The dyes of the present invention have both a sulfonic acid group and an azo group directly bonded to the same aromatic ring system and diaryl guanidine complexed to the sulfate. In many widely used dyes of this type, there are two such aromatic ring systems to which an azo and aryl guanadine-complexed sulfonic acid group are directly bonded. Dyes of this type are especially useful in inks, such as those used in ballpoint pens.

Dyes of this type are generally prepared by synthesizing compounds containing one or more aromatic ring systems directly to sulfonic acid and azo groups in an aqueous medium and then complexing this compound with a diaryl guanadine within the aqueous medium. The complexed dye precipitates from the aqueous medium as a fine powder which is collected, pressed and dried as a filter cake. In preparing inks from such dyes, the dyes are dissolved in an organic solvent system.

It has been found to be inconvenient and expensive to prepare solid complexed dyes and then to dissolve them in organic solvents. Handling powder is difficult and results in potentially hazardous human exposure. Powdered dyes are difficult to solubilize in organic solvents and invariably result in high insoluble levels. Also, it is difficult to produce dye solutions with high solids content by dissolving powdered complex dyes.

It is a general object of the present invention to produce liquid dyestuffs of the type in which a sulfonated aryl azo moiety is complexed with a diaryl guanidine without first producing a dye powder.

SUMMARY OF THE INVENTION

An aqueous solution of a dye base compound having at least one aromatic ring system to which both an azo group and a sulfate group are directly bonded is prepared, either by synthesizing the dye base in the aqueous medium or dissolving a dye base in an aqueous medium. The aqueous solution is contacted with an organic solvent phase comprising at least about 30 wt. percent benzyl alcohol and additional water-immiscible organic solvent so as to maintain a two phase system. The dye base is complexed with a diaryl guanidine in this two phase system; whereupon, the complexed dye concentrates in the solvent phase.

DETAILED DESCRIPTION OF CERTAIN PREFERRED EMBODIMENTS

The dye base according to the present invention contains at least one aromatic ring system to which both a sulfate group and either an azo group (—N=N—) or an N—N grouping of another aromatic ring system are generally attached. Thus the dye base of the present invention contains at least one moiety of the general formulae:

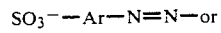

(I)

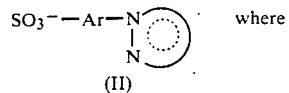 where (II)

represents a second aromatic ring system, such as:

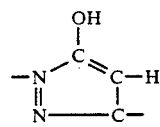

If the moiety is of formula (I), the —N=N— group is typically bonded directly to a further aromatic ring system. The Ar of formulae (I) and (II) may be a single, double or fused aromatic ring system, it being required only that the azo or aromatic N—N grouping and sulfonic acid group be bonded directly to the ring system, not necessarily on the same ring of the ring system. The Ar group generally is a carbon ring system, but may be a heterocyclic ring system. Typically, the dye base will contain two or more moieties of the formulae (I) and/or (II).

The diaryl guanidine has the general formula:

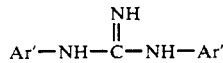

where the (Ar')'s are the same or different aromatic ring systems, of single or multiple, carbon or heterocyclic aromatic ring systems. Generally, Ar' is a single carbon ring system (benzene ring), substituted or unsubstituted. Commercially available diaryl guanidines include diphenylguanadine (DPG), di-ortho-tolylguanadine (DOTG), and mixed diaryl-guanidine (MDAG). The double-bonded nitrogen of the diaryl guanidine acts as a proton receptor to form a cation, whereby these compounds are strongly alkaline in aqueous solution. The cation of the diaryl guanadine complexes with the sulfonic acid groups of the dye base. Generally, sufficient diaryl guanadine is complexed with the dye base to complex all available sulfate groups.

Several of the useful dye bases are prepared by diazotization of compound having at least one amine group and one sulfonic acid group directly bonded to an aromatic ring and then coupling two such diazotized compounds through an aromatic coupling component. The dye base which is then produced is then complexed to the diaryl guanidine. The synthesis of one such dye, Luxol ® Brown K is as follows:

Reaction Sequence - Luxol Brown K

Diazotization

-continued
Reaction Sequence - Luxol Brown K

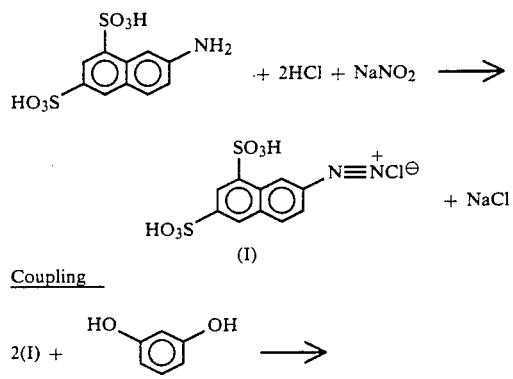

(I)

Coupling

2(I) +  HO—⌬—OH  →

-continued
Reaction Sequence - Luxol Brown K

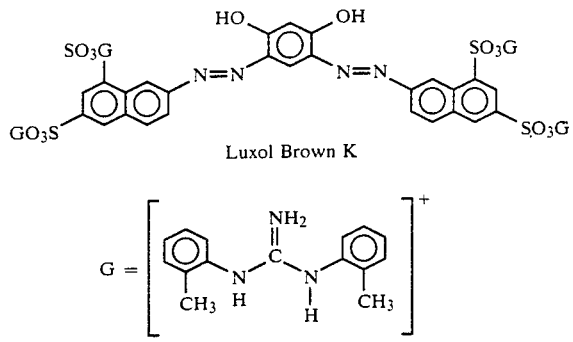

Luxol Brown K $$G = \left[ \begin{array}{c} \text{diaryl guanidine structure with } NH_2, \ NH, \text{ and two } o\text{-tolyl groups} \end{array} \right]^+$$

The following table gives the amine/sulfate compound that is diazotized, the coupling component, and the diaryl guanidine of a number of Luxol ® dyes.

Luxol Table

| Luxol Dye | Diazo | Coupling Component | Complexing Agent |
|---|---|---|---|
| Brown K | 2-amino-naphthalene-1,6-disulfonic acid | resorcinol (HO—⌬—OH) | DOTG |
| Blue ARN | 8-amino-1-hydroxy-naphthalene-3,6-disulfonic acid | 1-phenylamino-naphthalene-8-sulfonic acid | MDAG |
| Brown G | sulfanilic acid + 2,6-dimethyl aniline | resorcinol | MDAG |
| Orange GRL | HO₃S—⌬—N=N—⌬—NH₂ | NO₂—⌬—C=C—⌬—NO₂ with HO₃S and SO₃H | MDAG |
| Orange GS | HO₃S—⌬—NH₂ | resorcinol | DOTG |
| Red B | HO₃S—⌬—N=N—⌬—NH₂ | 2-hydroxy-naphthalene-1,6-disulfonic acid | MDAG |

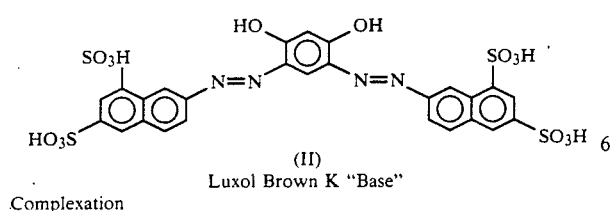

(II)
Luxol Brown K "Base"

Complexation

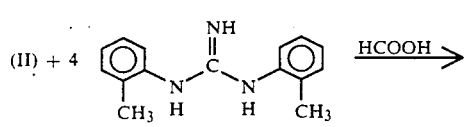

In addition, Yellow TN is produced by complexing tartrazine with DOTG.

In accordance with the invention, the complexing step is performed in a two phase system, including an aqueous phase and an organic solvent phase, which organic solvent phase comprises at least 30% benzyl alcohol; balance a compatible water-immiscible solvent. The dye bases are generally soluble in water. The diaryl guanadines are typically sparcely soluble in water, but more soluble in the solvent phase. The complexed dyes are generally much more soluble in the solvent phase than in the water phase. By complexing the dye base with the diaryl guanidine in a two phase system, precipitation of the dye is avoided. Instead the dye concentrates as a solution in the solvent phase in sufficiently high weight percentages to be used directly as the colorant of a ball pen ink or as a major component of such an ink.

Benzyl alcohol is selected as the major constituent of the solvent phase, primarily due to its viscosity, which is very appropriate for ballpoint pen inks. Benzyl alcohol is utilized at about 30 wt. percent of the solvent phase, up to 100 percent. Cosolvents, particularly water-immiscible alcohols, glycols and ethers, may be used to increase the solubility of the complexed dye, to adjust the viscosity or to impart drying properties to the ink. Suitable cosolvents of benzyl alcohol include, but are not limited to ethylene glycol phenyl ether, dipropylene glycol, propylene glycol, and mixtures thereof.

In addition to the advantage of not having to deal with powders and the attendant problems with resolubilizing powdered dyes, an important advantage of the method of the present invention is the simplicity by which solutions of 40-60 wt. percent solids is obtained. Inks for ballpoint pens are typically in this solids range, whereby the solvent phase containing the dye is suitable, without modification, for use as a colorant in ballpoint pen inks. Any downward adjustment in solids content may be made by addition of additional benzyl alcohol/cosolvent mixture.

Another advantage of the process of the present invention is that a much smaller aqueous phase is required. As noted above, the diaryl guanidines are sparcely soluble in water, and prior art processes have required a great deal of water. Because the present invention requires contacting separate solvent and aqueous phases, with the guanidine base being substantially more soluble in the solvent phase, the total amount of aqueous phase is substantially reduced.

In accordance with a further aspect of the invention, the method of complexing in a two-phase system as described above may be used to produce another important Luxol ® dye, Blue MBSN, which is a complex of MDAG and sulfonated copper phthalocyanine. Also, complexes of sulfonated copper phthalocyanine with other diaryl guanidines, such as DPG and DOTG may be performed by this method. Sulfonated copper phthalocyanine is not technically a sulfonated aryl azo compound, but has related structures and complexes with diaryl guanidines in a similar manner. Sulfonated copper phthalocyanine has the formula:

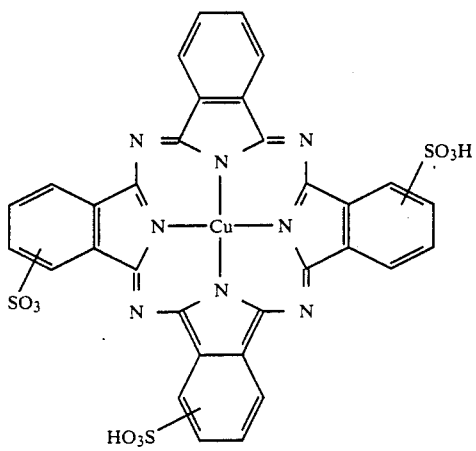

The above formula shows three sulfonic acid groups; however, the number of such groups may vary from molecule to molecule. An average number of sulfonic acid groups of between about 2.5 and about 2.8 per molecule are considered optimal. The diaryl guanidine is provided in a molar ratio relative to said sulfonated copper phthalocyanine of at least about 1:1, but preferably is provided in an amount sufficient to complex all of the sulfonic acid groups.

The invention will now be described in greater detail by way of specific example.

EXAMPLE

To a 12 liter 4-neck round bottom flask was charged 1350 gm Water and 265 gm Amino G Acid K+ Salt (80%) and 61 gm 50% caustic soda. This was stirred to a clear solution. 1.68 mole HCl (36%) was then added. The solution was cooled to 8°-10° C. with ice. The compound was diazotized with 47 gm sodium nitrite (100%) basis. The reaction proceeded until the compound fully diazotized with negative sulphone reagent test and positive congo red.

Now added to the flask was: 38 gm Resorcinol flake, with stirring to dissolve. Then over a 90 minute period, 171.4 gm sodium carbonate dissolved in 250 cc water was added. At the end of addition, there is a negative Beta Naphthol solution coupling test and a solution pH of 6.5-7.5.

200 gm each of Benzyl alcohol and Dowanol EPH are now added to the flask. At temperature of 15°-20° C. a solution of the following is added:
   5000 gm water
   105 gm Formic Acid
   550 gm Di-o-Tolyl Guanidine The reaction is followed by a spot test to see when conversion is completed. The dye was now in liquid phase at bottom of flask. The organic layer was now decanted and washed with water to conductivity levels of 2000 micro ohms or below. Water was removed from the dye by vacuum stripping. The final dye was standardized to 50% of solid standard by spectrophotometric absorbance measurement.

While the invention as been described with reference to certain preferred embodiments, modifications obvious to one with ordinary skill in the art may now be made without departing from the scope of the present invention.

Various features of the invention are set forth in the following claims.

What is claimed is:

1. A method of preparing a liquid dyestuff in organic solvent, the method comprising,
   preparing an aqueous solution of a dye base having at least one moiety of the general formulae selected from:

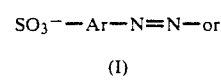

(I)

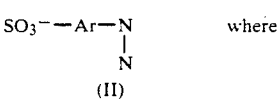

(II)

represents a second aromatic ring system, and the Ar of formulae (I) or (II) may be a single, double or multiple aromatic ring system, provided that the azo or aromatic N—N grouping and the sulfonic acid group be bonded directly to the ring system, adding an organic solvent phase comprising between about 30 and about 100 wt. percent benzyl alcohol, balance water-immiscible organic solvent, complexing said dye base with a diaryl guanidine in said two-phase system, whereby the dye which is produced is contained in said organic solvent phase, and separating said organic solvent phase.

2. The method according to claim 1 wherein said dye base has at least two moieties of formulae (I) and/or (II).

3. The method according to claim 1 wherein an amount of diaryl guanidine is added in an amount sufficient to complex substantially all of the sulphonic acid groups of said dye base.

4. A method according to claim 1 wherein said diaryl guanidine is selected from the group selected from diphenyl guanidine, di-ortho-tolylguanidine, and mixed diaryl-guanidine.

5. A method according to claim 1 wherein said water-immiscible solvent is selected from the group consisting of ethylene glycol phenylether, dipropylene glycol, propylene glycol and mixtures thereof.

6. A method of preparing a liquid dyestuff in organic solvent, the method comprising:

preparing an aqueous solution of sulfonated copper phthalocyanine, adding an organic solvent phase comprising between about 30 and about 100 wt. percent benzyl alcohol, balance water-immiscible organic solvent, complexing said sulfonated copper phthalocyanine with a diaryl guanidine in said two-phase system, whereby the dye which is produced is contained in said organic solvent phase, and separating said organic solvent phase.

7. The method according to claim 1 wherein an amount of diaryl guanidine is added in an amount sufficient to complex substantially all of the groups of said sulfonated copper phthalocyanine.

8. A method according to claim 6 wherein said diaryl guanidine is selected from the group selected from diphenyl guanidine, di-ortho-tolylguanidine, and mixed diaryl-guanidine.

9. A method according to claim 6 wherein said water-immiscible solvent is selected from the group consisting of ethylene glycol phenylether, dipropylene glycol, propylene glycol and mixtures thereof.

* * * * *

UNITED STATES PATENT AND TRADEMARK OFFICE
CERTIFICATE OF CORRECTION

PATENT NO. : 5,049,189
DATED : September 17, 1991
INVENTOR(S) : Friswell et al.

It is certified that error appears in the above-identified patent and that said Letters Patent is hereby corrected as shown below:

In the Abstract, line 8, "quanidine" should read --guanidine--

At column 5, line 62, "$SO_3$" should be --$SO_3H$--.

At column 6, line 58, "from:" should be --from the group consisting of:--.

At column 6, line 60, "$SO_3^- - Ar-N=N-or$" should be --$SO_3^- - Ar-N=N-and$--.

At column 6, lines 65-68, "$SO_3^-$-Ar-N where N " should be
                                           |           |
                                           N         N
(II)

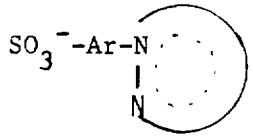 where  --.

Page 1 of 2

UNITED STATES PATENT AND TRADEMARK OFFICE
CERTIFICATE OF CORRECTION

PATENT NO. : 5,049,189

DATED : September 17, 1991

INVENTOR(S) : Friswell et al.

It is certified that error appears in the above-identified patent and that said Letters Patent is hereby corrected as shown below:

At column 7, line 15, "solvent," should be --solvent thereby forming a two-phase system,--.

At column 8, line 13, "solvent," should be --solvent thereby forming a two-phase system,--.

At column 8, line 19, "1" should be --6--.

Signed and Sealed this

Seventh Day of December, 1993

Attest:

BRUCE LEHMAN

Attesting Officer     Commissioner of Patents and Trademarks